April 1, 1930. P. PETTINELLI 1,752,963
GRID FOR CHEMICAL STORAGE BATTERIES
Filed April 30, 1928
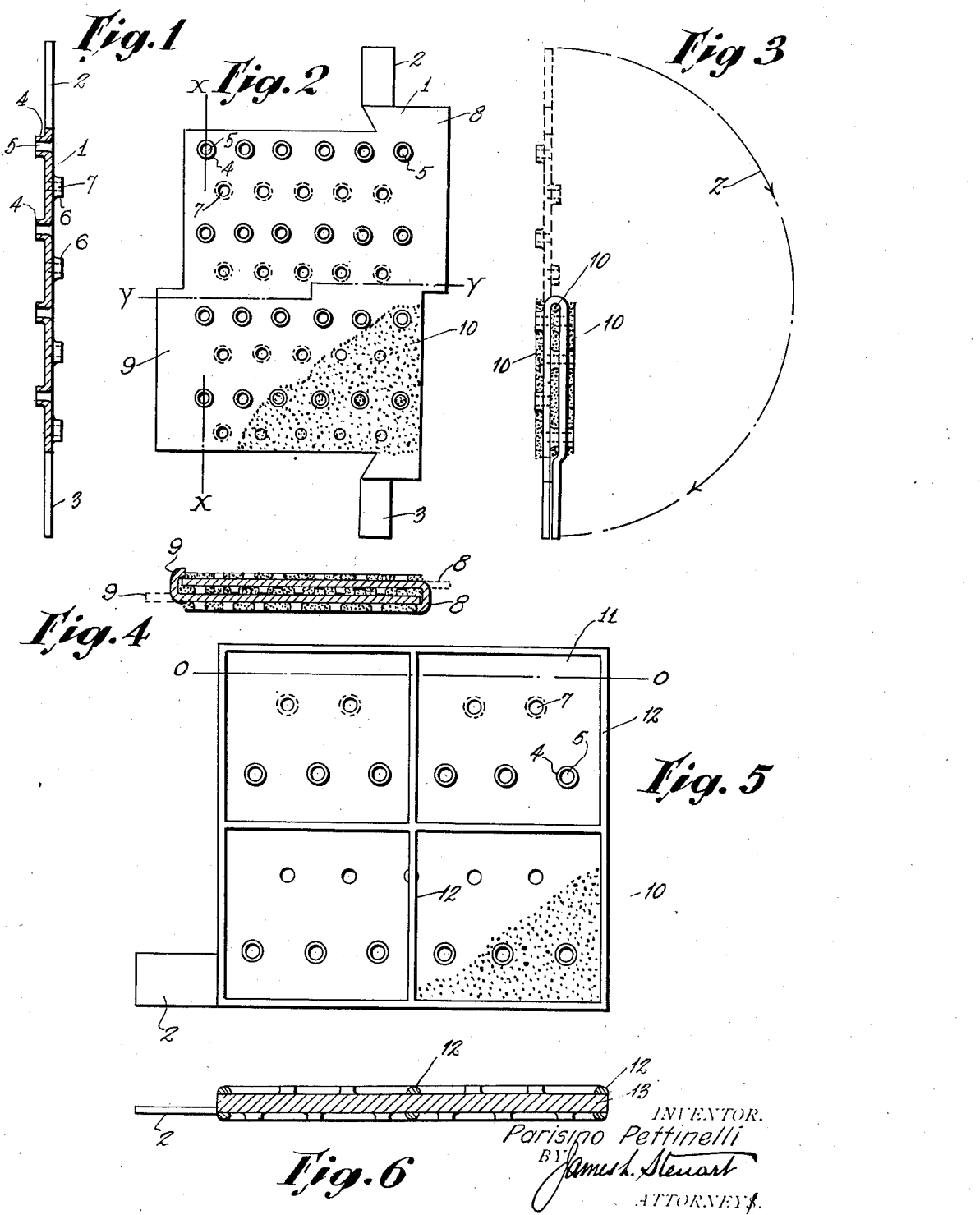

Patented Apr. 1, 1930

1,752,963

UNITED STATES PATENT OFFICE

PARISINO PETTINELLI, OF SAVONA, ITALY

GRID FOR CHEMICAL STORAGE BATTERIES

Application filed April 30, 1928. Serial No. 274,152.

This invention relates to the art of what is known as storage or accumulator batteries operating on the well known chemical lead acid cycle. It relates particularly to what is known in that art as a grid which is adapted to receive and carry the paste or active material employed in such batteries.

The construction of the grid hereinafter described accomplishes the complete utilization of the lead globules. Multiple plates are employed, that is to say, very thin plates bent over themselves and perforated in such a way as to form small tubes. The paste is distributed on the opposite sides of the plate, the greater quantity thereof being found on the inside of the plates as folded, the outer surface carrying approximately less than $\frac{1}{16}''$ of thickness of said paste. Flanges are provided on the edges to envelop the subject matter when folded. When the paste is enclosed within said grid it is compressed and permitted to dry. In small installations a square or rectangular blank is formed in such a way as to alternately place the positive and negative plates as in the usual secondary storage battery.

For large storage batteries a square plate is employed placed in a leaden frame. It is convenient to employ the usual type of separators in such case. It may also be possible to use a form of oiled textile treated so as to be resistant to acid.

The invention may be regarded as a new article of manufacture. It is illustrated in the accompanying drawings, special features being designated by numerals, like numerals referring to like parts. It will be understood that any suiable paste or active material may be supported by the skeleton herein described.

Figure 1 is a section taken on the line $x$—$x$ of Figure 2.

Figure 2 is a plan view of a blank adapted to be folded to form an envelope as hereinafter described.

Figure 3 is a diagrammatic view, partly in section, intended to illustrate the manner in which the plate is folded to form said envelope.

Figure 4 is a vertical section taken on the line $y$—$y$.

Figure 5 is a plan view of another form of construction.

Figure 6 is a horizontal section of Figure 5 taken on the line $o$—$o$ as viewed from the top of the plate.

1 indicates a thin sheet of lead. This sheet of lead is perforated with holes as 5 and 7, perpendicular to the plane of the sheet of lead, and associated with these perforations are protuberances 4 and 6. These structures may be formed in any suitable manner. The apertures 5 and 7, and the protuberances associated therewith 4 and 6, serve the purpose of keys to hold the active material characterized as paste in position with respect to the opposite surfaces of the lead plate 1. The paste referred to is designated as 10, and it will be noted that this paste fills the apertures 5 and 7, and lies between the protuberances 4—4 and 6—6, so that when the paste is applied it lies in a plane common to the top of the protuberances 4—4 and 6—6.

The plate 1 is preferably formed as a blank adapted to be folded to form an envelope. 2 and 3 serve the purpose of suitable electrical terminals, while 8 and 9 are flaps adapted to be folded over to seal the ends of the grid to enclose the active material as an envelope. The apertures 5 and 7 and the protuberances 4 and 6 are preferably disposed in the manner indicated so that the protuberances will serve as spacing means between the folded sections of the sheet 1, thus establishing a predetermined thickness of the active material or paste as applied to the surfaces of the sheet.

In practice the paste may be applied to the oppositely disposed faces of the plate 1, the thickness thereof preferably being limited by the height of the protuberances 4 and 6, as stated. The plate is then folded over intermediate its ends and the flaps 8 and 9 are also folded to complete the envelope. The associated elements are then subjected to a suitable compression and permitted to dry.

In Figure 3, the line $z$ diagrammatically illustrates the manner in which the plates are folded. In Figure 4, the flaps 8 and 9 are shown in dotted lines and the manner of their folding over is indicated in solid lines. In Figures 5 and 6 a second form of construction is illustrated, wherein one plate is exhibited constructed in the manner previously described, which is adapted to cooperate with the corresponding plate with which it is to be associated. In the latter construction 11 is the plate. 12 is preferably a frame adapted to be associated with said plate, the active material 10 being applied as previously stated.

Claims:

1. As a new article of manufacture, a storage battery grid embodying a sheet metal plate both faces of which are coated with active material, said plate being provided with integral staggered perforated bosses positioned alternately on opposite sides of the plate and extending through said coating to form keys whereby the coating is retained on said plate, said plate being bent intermediate its ends to cause each end portion of the plate to overlie the other end portion thereof with the bosses which extend from the inner face of each overlying portion bearing against the corresponding face of the other overlying portion to accurately space said portions apart.

2. As a new article of manufacture, a storage battery grid embodying a sheet metal plate both faces of which are coated with active material, said plate being provided with integral staggered perforated bosses positioned alternately on opposite sides of the plate and extending through said coating to form keys whereby the coating is retained on said plate, said plate being bent intermediate its ends to cause each end portion of the plate to overlie the other end portion thereof with the bosses which extend from the inner face of each overlying portion bearing against the corresponding face of the other overlying portion to accurately space said portions apart, a flange extending along one lateral edge of one of said overlying portions, and a flange extending along the opposite lateral edge of the other overlying portion, the flange of each of said overlying portions being bent over the unflanged juxtaposed edge of the other overlying portion.

3. As a new article of manufacture, a storage battery grid embodying a plate provided with integral staggered perforated bosses positioned alternately on opposite sides of the plate and of uniform height, said plate being bent intermediate its ends to cause each end portion of the plate to overlie the other end portion thereof with the bosses which extend from the inner face of each overlying portion bearing against the corresponding face of the other overlying portion to accurately space said portions apart, in combination with a coating of active material over both faces of the plate, said material filling the space between the overlying portions and covering the exterior faces of said portions to a depth substantially equal to the height of the other bosses, whereby said latter bosses serve as keys to retain said material in position.

4. As a new article of manufacture, a storage battery grid embodying a metallic envelope, the opposite side walls of which are provided with integral staggered perforated bosses positioned to extend alternately interiorly and exteriorly of said walls with the internal bosses of each wall bearing against the inner face of the opposite wall to accurately space said walls apart, in combination with active material filling the interior of the envelope, and a coating of active material covering the exterior of the envelope to a depth substantially equal to the height of the outer bosses which serve as keys to retain said covering in position.

Signed by me at Genoa, Italy, this 14th day of April, 1928.

PARISINO PETTINELLI.